B. H. SMITH.
ELECTRICAL PROTECTIVE DEVICE.
APPLICATION FILED AUG. 6, 1915.
1,241,571.
Patented Oct. 2, 1917.
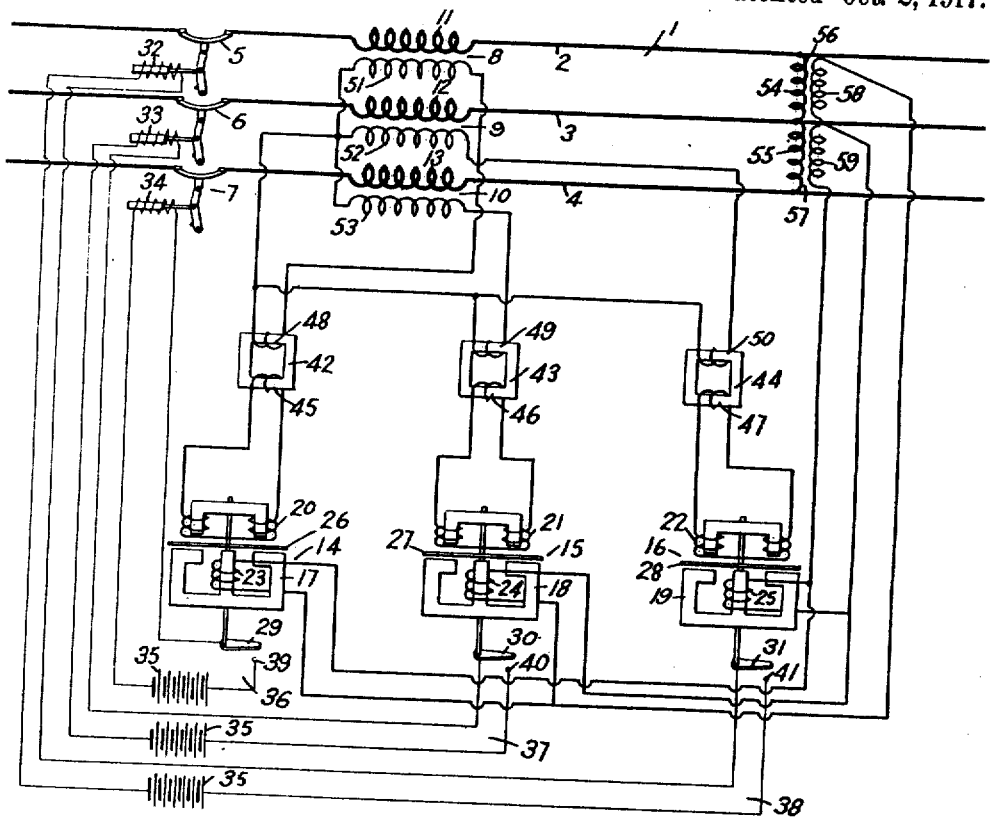
WITNESSES:
INVENTOR
Benjamin H. Smith
BY
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,241,571.  Specification of Letters Patent.  Patented Oct. 2, 1917.

Application filed August 6, 1915. Serial No. 43,975.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Protective Devices, of which the following is a specification.

My invention relates to electrical protective devices and particularly to watt relays.

The object of my invention is to provide watt or reverse-energy relays for polyphase electric circuits that will operate without vibration when relatively large overloads traverse the circuits.

In the usual watt relays heretofore employed for tripping circuit interrupters, upon the reversal of the power traversing the circuit, considerable difficulty was encountered at relatively large overloads. This difficulty consisted in the vibration of the contact members which caused ineffective engagement between them.

I provide means for limiting the current that is supplied to the current coils of the watt relay to thus reduce the vibration, and I further provide means whereby the correct phase relation between the currents traversing the potential and current windings of the relay is maintained.

In order to accomplish the above indicated results, I provide relatively small transformers that become magnetically saturated at predetermined loads, and I connect these transformers between the current windings of the relays and the circuit. However, at relatively high currents in the circuit, the phase angle of the current traversing the current windings will shift ahead a considerable amount, and the difference in phase relation between the current traversing the potential and the current windings will be of such value that, whenever there is a single-phase short circuit, the relays will not operate correctly. In order to overcome this difficulty, I connect the current windings in star relation to the circuit and the potential winding in delta relation. By such connections, the current traversing the potential windings is advanced substantially 30° ahead of the current traversing the current windings, under normal conditions. Thus, when the phase angle of the current traversing the current winding shifts forward because of the saturation of the relatively small transformers, there will still be sufficient angular difference between the phases of the currents in the two windings to effect correct operation.

The single figure of the accompanying drawings illustrates an electrical circuit that is protected by relays embodying my invention.

A polyphase electric circuit 1 comprises three conductors 2, 3 and 4. The conductors 2, 3 and 4 are provided with circuit interrupters 5, 6 and 7 and with current transformers 8, 9 and 10, respectively, the primary windings 11, 12 and 13 of which are connected in circuit with the conductors 2, 3 and 4, respectively. In order to trip the circuit interrupters 5, 6 and 7, upon the reversal of energy in circuit 1, I provide three watt relays 14, 15 and 16.

The watt relays 14, 15 and 16 comprise magnetizable core members 17, 18 and 19, current windings 20, 21 and 22, potential windings 23, 24 and 25 and rotatable armatures 26, 27 and 28 to which are operatively connected contact members 29, 30 and 31, respectively.

The circuit interrupters 5, 6 and 7 are provided with trip coils 32, 33 and 34, respectively, each of which is operatively connected to a source of electromotive force 35 to constitute tripping circuits 36, 37 and 38. The contact members 29, 30 and 31 coöperate with stationary contact members 39, 40 and 41 to constitute the separable terminals of the circuits 36, 37 and 38, respectively.

Three relatively small transformers 42, 43 and 44, the core members of which are adapted to become magnetically saturated under predetermined conditions, have their secondary windings 45, 46 and 47 operatively connected in circuit with the current windings 20, 21 and 22, respectively. The primary windings 48, 49 and 50 of the transformers are connected in circuit with the secondary windings 51, 52 and 53 of the transformers 8, 9 and 10. The windings 51, 52 and 53 are connected in star relation to the windings 11, 12 and 13. The primary windings 54 and 55 of two potential transformers 56 and 57 are connected to the circuit 1, and the secondary windings 58 and 59 thereof are connected to the potential windings 23, 24 and 25. From the foregoing, it will be understood that the current windings are star connected to the circuit 1 and the potential windings are delta connected to the circuit 1, whereby the current traversing the potential winding is shifted substantially 30° ahead of the normal current traversing the circuit 1.

If the potential windings 23, 24 and 25 are connected in star, and the saturatable transformers 42, 43 and 44 are used to preclude an excessive current to traverse the windings 20, 21 and 22, the phase-angular relation between the currents traversing the current and potential windings of the relays will be, under some conditions, greater than ninety degrees. This will cause the relays to function improperly because it will not indicate a reversal of the current in the defective circuit. However, if the potential windings 23, 24 and 25 are connected in delta, the current traversing the same is advanced substantially thirty degrees ahead of the current traversing the respective current windings, under normal conditions. Thus, when the phase angle of the current traversing the current windings shifts forward at high loads because of the saturatable transformers, the phase-angular relation between the currents traversing the current and potential windings will not exceed ninety degrees and the relays will function properly.

When a relatively large amount of energy traverses the circuit 1 in the reverse direction the windings 20, 21 and 22 will be energized by substantially constant current, and the potential windings will be energized by current that is proportional to the potential of the circuit and having a phase angle that is substantially 30° ahead of the phase angle of the normal current that traverses the circuit 1. The currents traversing the current and potential windings coöperate to cause the armatures 26, 27 and 28 to turn and the contact members 29, 30 and 31 to engage the stationary contact members 39, 40 and 41, respectively, to thereby trip the circuit interrupters 5, 6 and 7.

It is understood that my invention is not limited to the particular devices illustrated, but is capable of various modifications within the spirit and scope of the appended claims.

I claim as my invention:

1. In a polyphase electric circuit, the combination with circuit interrupters and relays for controlling the tripping of the said interrupters, of saturated transformers that are star connected to the circuit for supplying current to the current windings of the watt relays, the potential windings of the relays being delta connected to the circuit.

2. In a polyphase electric circuit, the combination with circuit interrupters and relays for controlling the tripping of the said interrupters, of star-connected means for supplying the current windings of the relays with substantially constant current, and means for so connecting the potential windings of the relays to the circuit that the phase-angular relation between the currents traversing the windings of the respective relays will be less than ninety degrees.

3. In a polyphase electric circuit, the combination with circuit interrupters and relays for controlling the tripping thereof, of means for supplying the current windings of the relays with substantially constant current, said means being star connected to the circuit, the potential windings of the relays being delta connected to the circuit.

4. In a polyphase electric circuit, the combination with watt relays having current and potential windings thereon, of means for supplying the current windings with substantially constant current, said means and the potential windings being so connected to the circuit that the current traversing the potential windings is thirty degrees ahead of the normal current traversing the circuit.

5. In a polyphase electric circuit, the combination with watt relays having current and potential windings thereon, of means operatively connected between the current windings and the circuit for causing the current that traverses the current windings to be substantially constant above a predetermined value, the potential winding being so connected to the circuit that the current that traverses the potential windings is a predetermined angle out of phase with the current that traverses the current windings.

6. In a polyphase electric circuit, the combination with watt relays having current and potential windings thereon, of means operatively connected between the current windings and the circuit for causing the current that traverses the current windings to be substantially constant above a predetermined value, the potential winding being so connected to the circuit that the current that traverses the potential windings is thirty degrees out of phase with the current that normally traverses the circuit.

7. In a three-phase electric circuit, the combination with circuit interrupters and reverse-energy relays for controlling the tripping of the said interrupters, of means for so controlling the current that traverses the current windings of the relays that they do not vibrate when excessive currents traverse the circuit.

8. In a three-phase electric circuit, the combination with circuit interrupters and watt relays for controlling the tripping of the said interrupters, of means for so controlling the current that traverses the current windings of the relays that they do not vibrate when excessive currents traverse the circuit, the current and potential windings of the relays being so connected to the circuit that the currents traversing the same are maintained in predetermined phase relationship.

9. In a three-phase electric circuit, the combination with circuit interrupters and watt relays for controlling the tripping of the said interrupters, of means for so controlling the current that traverses the current windings of the relays that the movable members thereof do not vibrate when excessive currents traverse the circuit, the current and potential windings of the relays being so connected to the circuit that the current which traverses the potential winding is thirty degrees ahead of the current that normally traverses the circuit.

In testimony whereof, I have hereunto subscribed my name this 30th day of July 1915.

BENJAMIN H. SMITH.

Copies of this patent may be obtained for five cents each, by addressing the "Commissioner of Patents, Washington, D. C."